Figure 2:
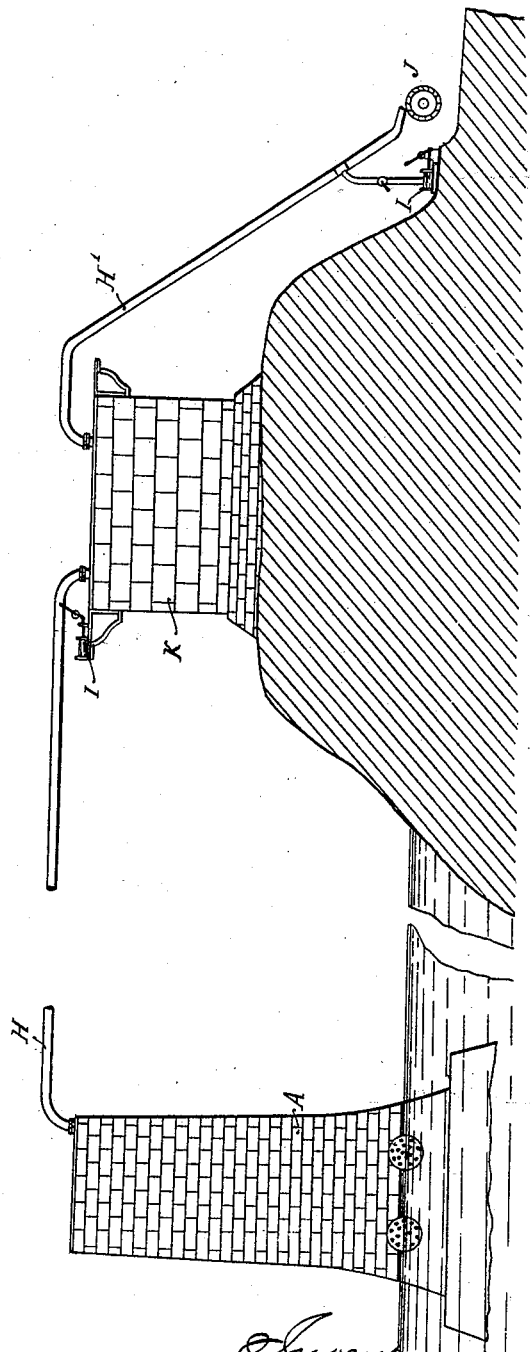

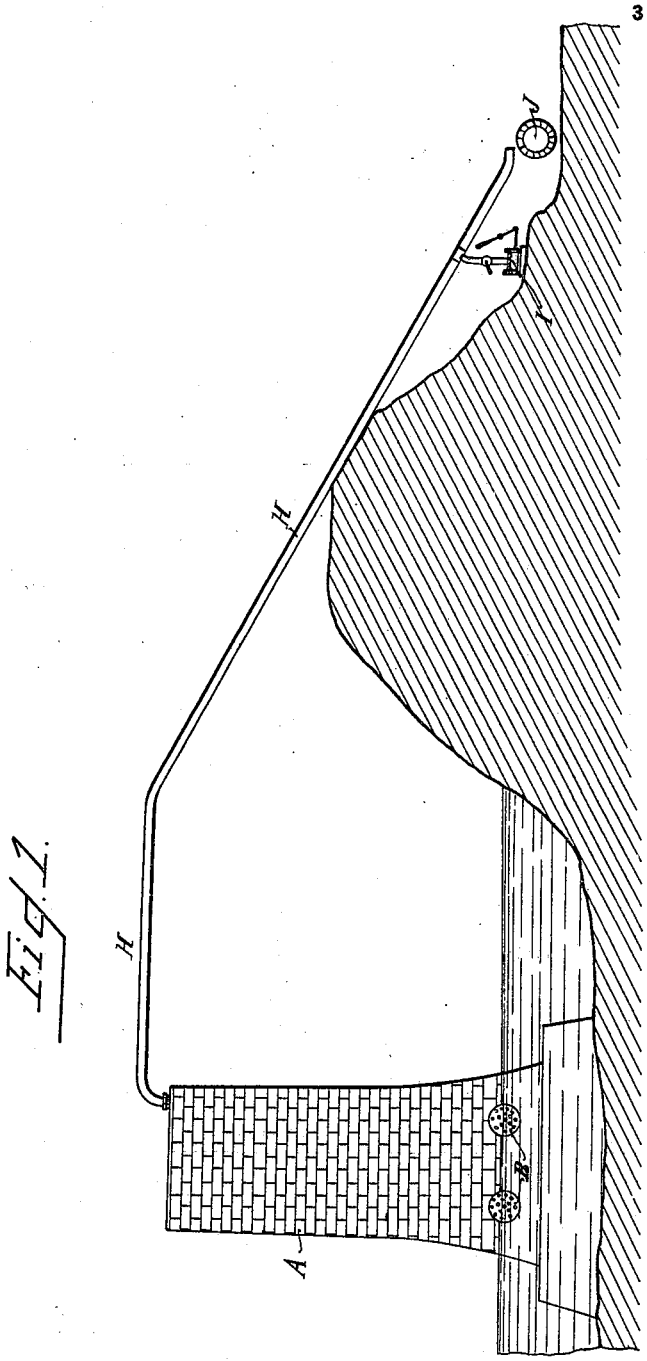

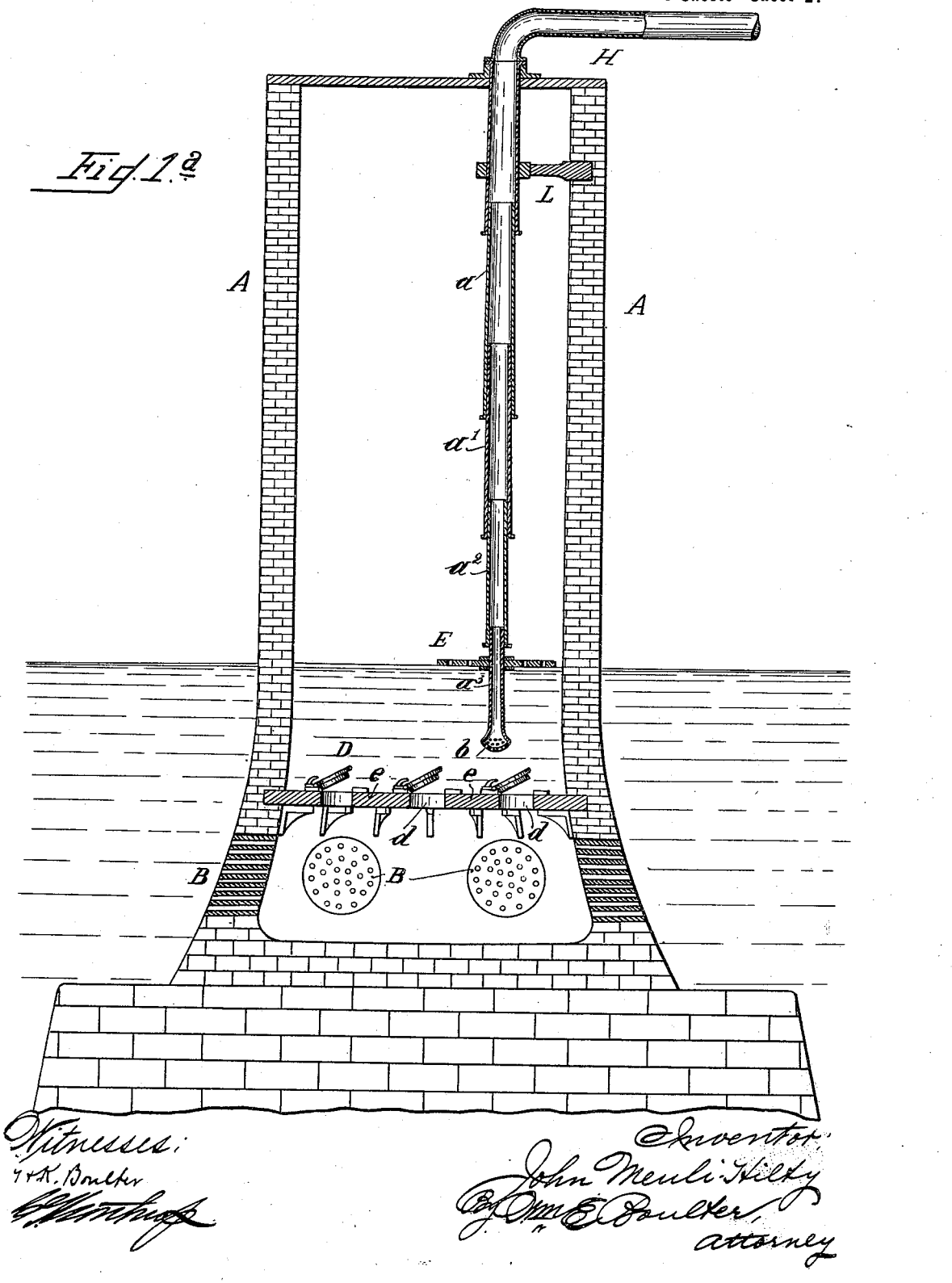

No. 648,041. Patented Apr. 24, 1900.
J. MEULI-HILTY.
TIDE UTILIZING APPARATUS.
(Application filed July 22, 1898.)
(No Model.) 3 Sheets—Sheet 3.

Witnesses:
H. H. Boulter

Inventor:
John Meuli-Hilty
By Wm. E. Boulter
attorney

UNITED STATES PATENT OFFICE.

JOHN MEULI-HILTY, OF MAERSTETTEN, SWITZERLAND.

TIDE-UTILIZING APPARATUS.

SPECIFICATION forming part of Letters Patent No. 648,041, dated April 24, 1900.

Application filed July 22, 1898. Serial No. 686,608. (No model.)

*To all whom it may concern:*

Be it known that I, JOHN MEULI-HILTY, a citizen of Switzerland, residing at Maerstetten, Switzerland, have invented certain new and useful Improvements in Tide-Utilizing Apparatuses, of which the following is a specification.

The present invention relates to apparatus for utilizing the force of tides, and has more particular reference to a water-accumulator adapted to store a large quantity of water at the high water to utilize it afterward for actuating hydraulic motors.

Most of the apparatuses and arrangements heretofore invented for utilizing the force of tides have not been carried out and put into practice because they require difficult and costly erections to produce only a comparatively small power. These inconveniences are done away with in the accumulator forming the object of the present invention and which requires but the installation of a tower in the sea to receive and hold the water, which is afterward led through a siphon to the hydraulic motors, as more fully and clearly pointed out and claimed hereinafter.

In the accompanying drawings is shown one form of construction of this accumulator embodying my invention, and in the drawings, Figure 1 is an elevation of the apparatus in its general arrangement. Fig. 1$^a$ is a sectional elevation of a portion of the device. Fig. 2 is a view similar to Fig. 1, showing a slight modification.

Similar letters refer to similar parts throughout all the figures.

A is a tower forming a reservoir.

B shows openings connecting the tower with the sea.

C is a partition provided with valves D.

E is a float.

H H' are siphons.

I designates suction-pumps.

J is a hydraulic motor.

K is an intermediary reservoir, and L is a support.

The water-accumulator is formed of a reservoir A in the form of a lighthouse without roof and lantern, constructed as far as possible in the sea, and the bottom part of which communicates with the sea by openings B, provided with perforated metal plates to prevent marine plants or fishes from getting into this reservoir, at the same time allowing a free access of water. Within the reservoir and above the openings B is arranged a partition C, provided with valves for retaining the water and which only open upward. The water of the reservoir A flows through the siphon H, leading it to any hydraulic motor, wheel, or turbine J, arranged a little above the level of the low water to allow of the flowing of the water. The siphon is connected with a suction-pump I to start the same. Moreover, this siphon is supported within the tower A by the bracket L and terminated by several tube portions $a$ $a'$ $a^2$ $a^3$, the diameters of which are successively smaller and smaller, so as to allow these tube portions to be telescoped into one another. The tube $a^3$ is terminated at its lower end by a rose-head $b$ and supported by the float E, which follows the water-level within the reservoir A.

Instead of directly leading the water to the hydraulic motors the siphon H may lead the same into an intermediary reservoir K, whence, through another siphon H', it is led to the motor J. This arrangement allows of storing a larger quantity of water.

When the coast has a strong surf, one or more reservoirs K may be established, said reservoirs being of a comparatively-small height, but very long, so as to be able to retain the masses of water which are projected upward and which fall into the reservoir, whence they are led to the motor through the siphon already described.

The application of the water-accumulator A is based upon the principle of connected vessels filled with any liquid, owing to which principle the water rises in the reservoir A to the level of the sea; but when this latter descends the water can only flow through the siphon H, since the valves D open upward only to allow of the introduction of water and prevent its flowing out on this side. The telescopic arrangement of the inner end of the siphon H allows the maximum of yield to be obtained, for as the float follows the variations of the water-level the sections $a$ $a'$ $a^2$ $a^3$ will telescope together, thus giving more space within the reservoir for the storage of water.

Having fully described my invention, what I claim, and desire to secure by Letters Patent, is—

1. In a water-accumulator for utilizing the force of tides, the combination of a reservoir for storing the water, a siphon for leading the water to a motor, a portion of the siphon within the reservoir comprising telescopic sections, a float connected with one of the sections, a suction-pump to start the siphon, and a motor to utilize the force of the water.

2. In a water-accumulator for utilizing the force of tides the combination of a reservoir of a suitable construction constructed in the sea and provided with openings at its lower part for the admission of the water into the reservoir, and a horizontal partition arranged inside the reservoir above the water-admission holes and provided with valves opening upward to allow the water to penetrate into and to be retained in the upper part of the reservoir, substantially as described and for the purpose set forth.

3. In a water-accumulator for utilizing the force of tides the combination of a siphon for the flowing of the water to the motor; tube portions adapted to telescope into one another and arranged at the end of the smaller siphon branch to vary the length of said branch and finally an end tube portion terminating in a rose-head and provided with a float to follow the variations of the water-level within the reservoir, substantially as described and for the purpose set forth.

JOHN MEULI-HILTY.

Witnesses:
O. ALTWEGG MOTAV,
ADOLPH L. FRANKENTHAL.